(12) United States Patent
Balm et al.

(10) Patent No.: US 9,998,153 B2
(45) Date of Patent: Jun. 12, 2018

(54) FRONT-END MODULE FOR CARRIER AGGREGATION MODE

(71) Applicant: Snaptrack Inc., San Diego, CA (US)

(72) Inventors: Bart Balm, Kekerdom (NL); Carem Destouches, Delft (NL); Leon C. M. van den Oever, Rosmalen (NL); Ooijman Remco, Nijmegen (NL)

(73) Assignee: SnapTrack, Inc., San Diego, CA (US)

( * ) Notice: Subject to any disclaimer, the term of this patent is extended or adjusted under 35 U.S.C. 154(b) by 0 days. days.

(21) Appl. No.: 15/120,873

(22) PCT Filed: Mar. 14, 2014

(86) PCT No.: PCT/EP2014/055114
§ 371 (c)(1),
(2) Date: Aug. 23, 2016

(87) PCT Pub. No.: WO2015/135588
PCT Pub. Date: Sep. 17, 2015

(65) Prior Publication Data
US 2016/0365878 A1 Dec. 15, 2016

(51) Int. Cl.
*H04B 1/00* (2006.01)
(52) U.S. Cl.
CPC .......... *H04B 1/006* (2013.01); *H04B 1/0053* (2013.01)

(58) Field of Classification Search
None
See application file for complete search history.

(56) References Cited

U.S. PATENT DOCUMENTS

| | | |
|---|---|---|
| 7,142,884 B2 | 11/2006 | Hagn |
| 8,077,656 B2 | 12/2011 | Korden et al. |
| 9,374,123 B2 | 6/2016 | Schmidhammer |
| 2006/0103003 A1 | 5/2006 | Heide et al. |
| 2013/0241666 A1 | 9/2013 | Granger-Jones et al. |
| 2013/0335160 A1 | 12/2013 | Khlat |

FOREIGN PATENT DOCUMENTS

| | | |
|---|---|---|
| GB | 2491430 A | 12/2012 |
| WO | WO-2004064140 A1 | 7/2004 |
| WO | WO-2006040093 A1 | 4/2006 |
| WO | WO-2010066526 A1 | 6/2010 |
| WO | WO-2012146512 A1 | 11/2012 |
| WO | 2013041146 A1 | 3/2013 |
| WO | WO-2014010575 A1 | 1/2014 |
| WO | WO-2014013915 A1 | 1/2014 |

OTHER PUBLICATIONS

International Search Report and Written Opinion—PCT/EP2014/055114—ISA/EPO—dated Dec. 9, 2014.

*Primary Examiner* — Diane Lo
(74) *Attorney, Agent, or Firm* — Patterson & Sheridan, L.L.P., Qualcomm (57) ABSTRACT

A new front-end module is disclosed. In an embodiment the front-end module is configured to operate carrier aggregation modes using a cascade of switches and an intelligent set of bands. The module can be assembled by sub-modules.

18 Claims, 6 Drawing Sheets

FRONT-END MODULE FOR CARRIER AGGREGATION MODE

This patent application is a national phase filing under section 371 of PCT/EP2014/055114, filed Mar. 14, 2014, which is incorporated herein by reference in its entirety.

BACKGROUND

In a cellular communication with carrier aggregation (CA) enabled, multiple bands are active at the same time (single mode pass band plus CA mode counter band). In such a carrier aggregation mode, two or more signal paths containing filters or duplexers are circuited in parallel to increase the data rate. No problems arise if in the carrier aggregation mode each band uses a separate antenna. However, in case the two signal paths assigned to two aggregated bands are coupled in parallel to the same antenna mutual loading or blocking is required to avoid power loss.

In receive (RX) CA mode, with signals going from one antenna (AT) to receiver via low noise amplifiers (LNAs), it is important that the signal paths do mutually block and not load each other for each combination of pass band frequency and counter band frequency, because that would otherwise result in power loss and higher insertion loss.

In transmit (TX) CA mode, with signals going from transmitting power amplifiers (PAs) represented by ports P1 and P2, it is important that the signal paths do mutually block and not load each other for each combination of pass band frequency and counter band frequency, because that would otherwise result in power loss and lower output power and lower efficiency.

Here we focus on RX CA mode, but the principles also apply to TX CA mode.

To manage the increasing data traffic, more and more bands assigned to respective frequency ranges are defined. Hence, the number of defined carrier aggregation band combinations increases, too. Front-end modules that can operate within a majority of these bands and band combinations and that are designed according to the conventional approach become big and complex with adverse effects on their performance. Such complex front ends show high insertion losses (IL), and reduced isolation. Further, costs and effort for development increase and the chances for a successful business with these developments get worse.

A standard solution for carrier aggregation makes use of phase shifters which translate the impedance at a given counter frequency band XXX (also called out-of-band (OOB) impedance) into a high impedance like for an open circuit. With two bands to be combined in a CA mode, each band is matched for in-band, and an open circuit is set for OOB. Usually, these two bands for CA mode are coupled to a switch that can be controlled by so-called direct mapping. This means that all throws of the switch can be controlled and activated independently. So it is possible to activate one throw for single band mode or to activate two throws for carrier aggregation mode where two bands are connected in parallel to one antenna terminal or antenna feed to operate simultaneously at the same time. As a consequence, the insertion loss in single band operation mode increases due to the loss of the phase shifter. This is because L and C components that are used have a limited quality factor Q. And in carrier aggregation mode, the insertion loss increases also due to the loading of the counter band in parallel. That is because the magnitude of the OOB reflection coefficient Γ of the counter band—at the combining reference plane, at the switch—is not an ideal open but finite due to the limited Γ (reflection coefficient) of the filter and the limited Q (quality factor) of the phase shifter. Another disadvantage is that this solution is more or less limited to two parallel bands.

Figure 1:
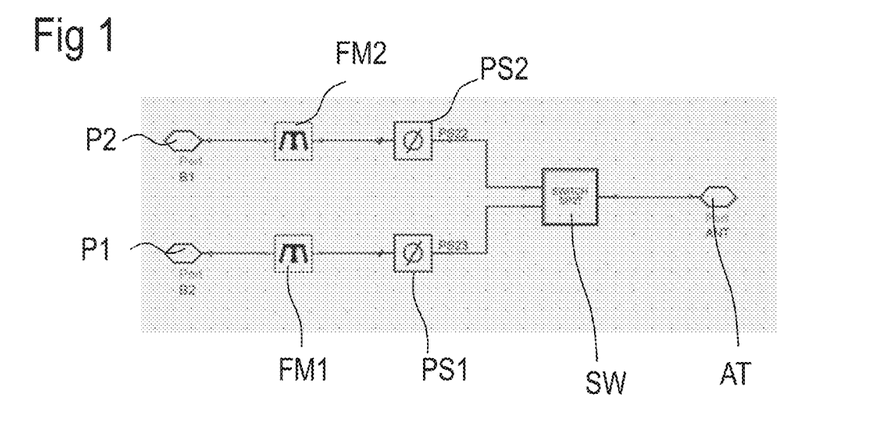
FIG. 1 shows carrier aggregation using phase shifters.

FIG. 1 shows a block diagram of a circuit that allows carrier aggregation mode as well as single mode operation in one of the two bands. The input of a switch SW is connected to an antenna terminal AT. The first output of the switch SW is connected to a first signal path. In the signal path, a phase shifter PS1 is arranged as well as filter means FM1, both circuited in series. The phase shifter PS1 is adapted to provide a high impedance state for signals within the band of a second signal path. The second signal path is connected with a second output of the switch SW and comprises a second phase shifter PS2 and a second filter means FM2. The second phase shifter PS2 is adapted to set a high impedance state for signals within the first band. Terminals providing the respective signal for further operation are referenced by P1, P2.

Figure 2:
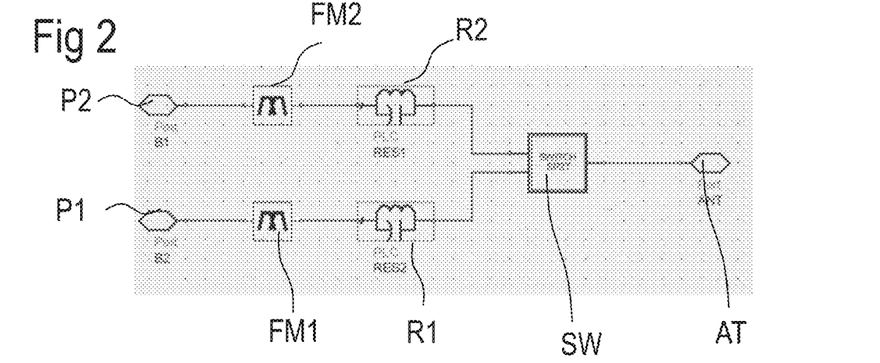
FIG. 2 shows carrier aggregation using resonators.

Another kind of switchplexing within the carrier aggregation mode is shown in FIG. 2. Instead of phase shifters, a series resonator R1, R2 is used to realize an open circuit that is a high impedance state at OOB that means for counter band frequencies. FIG. 2 shows such a circuit where the phase shifters PS from FIG. 1 are substituted by respective resonators R1, R2.

Figure 3:
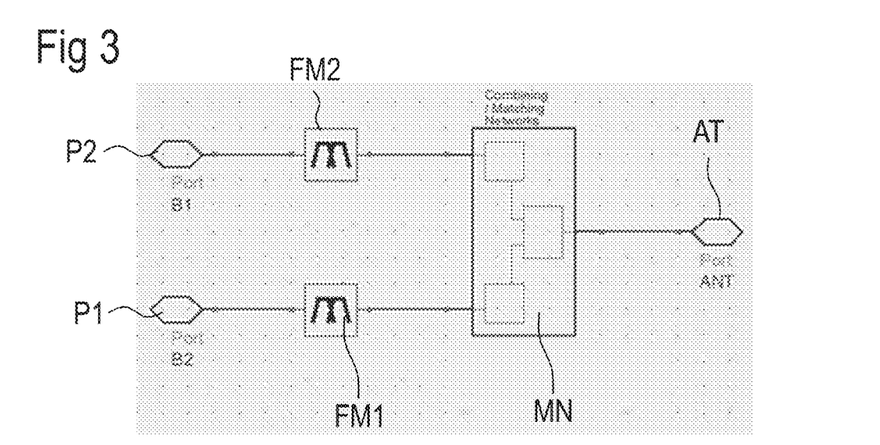
FIG. 3 shows carrier aggregation by direct diplexing, using a combining/matching network.

A third known solution for carrier aggregation mode is direct multiplexing shown in FIG. 3. In this case, no switch is involved, the two signal paths each comprising filter means FM are directly connected via a matching and combining network MN. The matching and combining network MN provides a proper in-band matching and good separation for OOB/counter band frequencies, thereby making use of resonance with the out-of-band capacitance of the filter input admittance. This solution is practically also limited to a parallel circuit of only two signal paths operating in two different bands.

When constructing a front-end module for a multitude of different bands that additionally allows carrier aggregation modes for a set of defined band combinations a switch is required having a respective number of throws. Usually more than ten throws are needed to allow a roaming in different regions of the world where different band combinations are in use.

Figure 4:
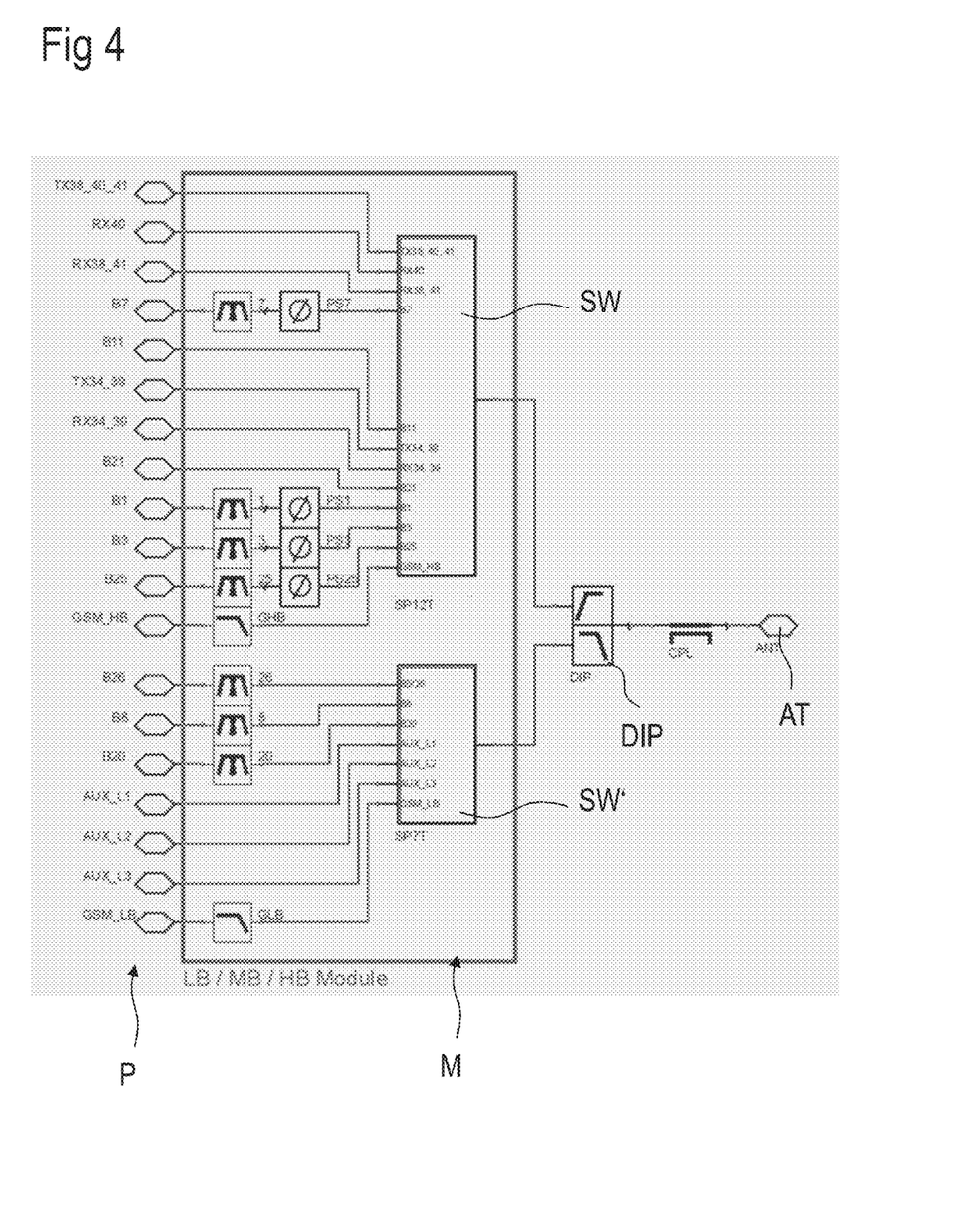
FIG. 4 shows a known front-end module allowing carrier aggregation of band pairs.

FIG. 4 shows an exemplary block circuit of such a known module. The figure shows an antenna terminal AT connected to a diplexer DIP. The two outputs of which are connected to a switch SW respectively. The upper switch SW shown in the figure is an SP12T, this means the switch SW can couple the switch input and thus, the diplexer with a desired one or a desired combination of the twelve switch outputs. To the outputs, different signal paths operating in different bands are connected. Part of the signal paths comprise filter means, part of the signal paths comprise phase shifters for those bands that are selectable for defined carrier aggregation modes. The second output of the diplexer DIP is connected to a second switch SW' which is in this embodiment an SP7T switch having seven throws. To this switch, a respective number of signal paths assigned to different bands is connected.

A front-end module like that depicted in FIG. 4 gives rise to different problems. First, in a switch of eight or more switch throws, a crossover point occurs: the insertion loss increases more and more with the number of throws while matching and isolation deteriorates due to coupling between the signal paths or the routing lines for the signal paths respectively. Most of coupling arises around the switch area. Furthermore, the linearity of the switch gets worse for high throw count.

Second, with all bands circuited in parallel via the switch, it becomes more difficult to address all different carrier aggregation band combinations with phase shifters. The design becomes complex or nearly impossible, will be big in size and provides too high insertion losses. Third, with so many bands and carrier aggregation band combinations, it is not attractive for the business of a manufacturer to integrate all the bands and band combinations in one module. Hence, it would be more economical to have a smaller solution which at best should be designed in a modular way and may be extended by plug and play of further parts, if required.

SUMMARY OF THE INVENTION

Various embodiments provide a front-end module comprising an economical set of bands that can be operated in single band mode and in carrier aggregation mode as well. The architecture of the front-end module should be flexible, expandable and should show better performance than a known front-end like that shown in FIG. 4.

The invention discloses a front-end module that is restricted to core bands, which is expandable by sub-modules, which avoids high throw count switches that otherwise would produce high losses, poor isolation, and worse linearity. Instead it uses therefore a cascade of a first and a second switch. The front-end module can be operated in at least one carrier aggregation mode, thereby combining the signal paths that are coupled to different outputs of the first switch.

The front-end module comprises an antenna terminal connected to the input of a first switch having a number of k outputs where k is an integer equal or greater than 3.

Further, a second switch is connected to an output of the first switch via at least two different paths that can be routed via settings of the first switch. A first route connects the first switch directly with the input of the second switch via a bypass. A second route connects the output of the first switch with the input of the second switch via a first notch path comprising a first notch. A third route connects another output of the first switch with a first auxiliary signal path that is assigned to a band of a first auxiliary communication system.

The first auxiliary signal path may be filter path comprising a filter for the band of the first auxiliary communication system for example.

The notch within the notch path comprises a resonator adapted to provide a high-impedance element for a notch frequency assigned to the band of the first auxiliary communication system.

There are at least n outputs at the second switch each connected to a main signal path respectively assigned to a band of a respective main communication system where n is an integer equal or greater than 2.

The front-end module is adapted to operate in a single band operation mode in one of the main bands or in the auxiliary communication system. Further, in a first carrier aggregation mode, the module can operate simultaneously in one of the main bands and in the auxiliary band. Single band operation mode and first carrier aggregation modes can be set by the first and/or the second switch. Advantageously, the first and second switch can be set by direct mapping each.

In the first carrier aggregation mode, a main signal path is coupled to the antenna terminal via at least one first notch path and the second switch enabling this main path. At the same time a first auxiliary signal path is coupled to the antenna terminal in parallel to the main signal path via a throw (output) of the first switch.

In a most simple embodiment according to the invention, the first switch comprises four outputs. Compared to a front-end module having a single antenna switch for connecting all provided signal paths to the antenna terminal, the proposed front-end module uses a first switch that is comparable to the antenna switch of known solutions but has a lower number of throws. Such a low throw switch does not produce undesired losses.

The notches in the notch path are to realize an open for the counter band. A respective notch path is connected to a main signal path only if required in a carrier aggregation mode. In a single band operation mode, the signal can be routed via the bypass from the first to the second switch and from the second switch to the respective main signal path. By this way, the notch does not produce any loss in this mode.

Further, each notch can be used manifold if the band that is blocked by the notch is member of different band combinations of different carrier aggregation modes. Thereby, at least one component can be saved and the design becomes simpler.

The auxiliary signal path can be assigned to a band that has severe specifications and is thus difficult to design with low losses. In the proposed front-end module, this auxiliary signal path is directly connected to the antenna via the first switch and needs not going through a cascade of two switches. Hence, this band with sophisticated specifications can be handled separately and can thus be optimized. By this way, low loss operation is possible in single band operations as well as in carrier aggregation mode. The routing of the signal through the first auxiliary path can be done with high isolation and without signal line crossings.

A phase shifter can be used in the auxiliary signal path for blocking or not loading the signals of the counter band in a carrier aggregation mode including the band of the auxiliary signal path. A phase shifter can block a signal of a given frequency if the phase shifter is set to provide a high impedance element for the frequency of the band to be blocked.

Further, a main signal path may also be provided with a phase shifter. If more carrier aggregation modes have to be implemented, further notch paths can be provided to connect an output of the first switch to the input of the second switch. Alternatively, blocking in carrier aggregation mode can be achieved by placing phase shifters in each of the bands to be coupled in parallel in carrier aggregation mode.

The first switch is enabled to route a signal through a selected signal path coupling the output of the first switch to the input of the second switch, respectively. A bypass couples first and second switch directly. Hence, the notch path can be switched on or off by routing the signal through the bypass or through the notch path. In carrier aggregation mode, the respective notch path is active when simultaneous operation in a main signal path and the first auxiliary signal path are required.

Further outputs of the first switch can be connected to a circuitry that may be a signal path for a single band only or a kind of multiplexer for connecting the further output of the first switch to a multiple of signal paths by the multiplexer. Such a multiplexer may be a diplexer or a fourth switch, for example.

Phase shifters are typically used in a signal path when the respective band is involved in a certain single CA band combination once. Resonators are typically used when a band is involved in two or more CA band combinations. For the first case it can still be attractive to use a resonator, or combination of resonator plus phase shifter, to achieve a solution with improved insertion loss.

In an embodiment of the front-end module, two or more different first carrier aggregation modes can be set alternatively. In each of these first carrier aggregation modes, a respective one of the main signal paths is actively coupled to the antenna terminal via the notch path comprising an open for the first auxiliary communication system. Simultaneously the first auxiliary signal path is actively connected to the antenna terminal by a respective setting of the first switch. This means that one notch path is used for two different band combinations in two first carrier aggregation modes. Such combinations comprise the auxiliary band and two or more main signal paths.

According to a further embodiment, a further carrier aggregation mode can be set by connecting in parallel two further signal paths independently selected from one of the main signal paths and one of the first auxiliary paths to the antenna in parallel. Each of the further signal paths comprises a phase shifter adapted to mutually provide an open state for a signal having a frequency within the counter band of the respective further carrier aggregation mode. The respective main signal path is connected to the first switch via the bypass.

As mentioned above, these further carrier aggregation modes can be enabled by using phase shifters arranged in each of the signal paths to be combined in the further carrier aggregation mode. This embodiment is preferred only when the bands to be combined in the further carrier aggregation mode are used for this carrier aggregation mode only besides the single band operation mode that is always possible by selecting a suspecting switch setting.

In a modification, the front-end module comprises a second antenna terminal to connect to a selected series of third signal paths via a third switch. This needs a second antenna provided by the mobile radio device. Each of the third signal paths can be assigned to operate in a high band having a frequency higher than the frequencies of the bands assigned to the main signal path. Alternatively, if the bands of the main communication system are located in the high band the third signal paths may be assigned to operate in the low band area. Accordingly the second antenna may be optimized for operation at low band frequencies.

In this embodiment, one throw of the third switch couples a selected third signal path to the second antenna terminal. By doing this, CA combinations between this respective third signal path and another signal path connected via the first switch or to the second switch to the first antenna terminal can be accomplished by antenna multiplexing, requiring sufficient isolation between the first antenna and the second antenna, and does not need extra measures such as phase shifters or resonator in the front-end-module. Further, the isolation between this respective third signal path and another signal path connected via the first switch or to the second switch to the first antenna terminal is higher.

A further advantage of a second antenna arises as a frequency optimization of the second antenna is possible which optimization is better for a smaller frequency range than for a broad frequency range. Hence, both antennas can be assigned to a specific frequency range which may be a low band and a high band range for example.

A further way for assigning frequency ranges to the antennas can be made with respect to harmonics of the basic frequencies the antennas are working in. This means, a first antenna has to be assigned to a first frequency range and to a second frequency range which is a harmonic of the first frequency range. A second antenna can then be assigned to a frequency range different from the first frequency range and the respective harmonic frequencies.

According to another embodiment of the invention, the front-end module comprises a fourth switch whose input is connected to an output of the first switch. The fourth switch comprises outputs that are connected to a respective one of fourth signal paths that are assigned to a respective band of a respective fourth communication system. Selected bands of the fourth communication systems may be used for carrier aggregation modes. An open for OOB frequencies can be set by implementing a respective phase shifter or a notch within such a fourth signal path. This means the first switch allows to connect the main signal path, the third signal path and the auxiliary path to the same antenna terminal alternatively or, maybe, in parallel if a carrier aggregation mode is set.

The fourth switch, the fourth signal path and part of the third signal paths as well can be arranged on a sub-module which may be consumer-specific. If in addition to the "core bands" or main bands specific other bands are required in a region of the world the according signal paths can be implemented via said sub-module as a third and/or fourth signal path.

Another possibility is to group bands and respective signal paths according to their frequency range on this sub-module. As an example, the third signal paths may be assigned to high bands operating in a high frequency range that may be located above 2.3 GHz, for example.

Such a third and a fourth switch and the respective signal paths have the advantage that the third and fourth signal paths can be separated from the main signal paths as well as from auxiliary signal paths, thereby, the isolation between these two groups of signal paths can be enhanced.

According to a further embodiment, each of first auxiliary signal paths, main signal paths and third signal paths comprises at least one of a bypass, a duplexer, a filter, a transmission line, or a phase shifter, or a resonator. A bypass is a signal line without any discrete element therein. But a bypass may have the parasitic properties of a transmission line, an inductance or maybe a capacitance.

Each of the signal paths may have one or more of discrete or parasitic inductance and/or capacitance in series and/or in parallel. Duplexers and filters are assigned to the respective band of the signal path that is the frequency range the signal path operates in. The phase shifter is adapted to shift the phase of a specific counter band to an open state and hence presents a high input impedance for frequencies of the counter band. A transmission line may work together with a duplexer or the phase shifter or the resonator.

According to another embodiment, all elements that are necessary to exclusively enable a carrier aggregation mode are arranged on a sub-module that can be implemented as an add-on to the main module. This has the advantage that a front-end module without this sub-module can alternatively operate in single-band modes without the need of implementing any other element instead of the sub-module for carrier aggregation. This is true if only main signal paths are present that are selectable by a second switch which can be coupled directly to the first antenna terminal when the carrier aggregation sub-module is omitted. When the sub-module is omitted, insertion loss and occupied area and associated cost will be lower.

More bands and thus more signal paths can be coupled to the antenna port when inserting the new first switch with outputs that can be connected to the second and maybe a fourth switch. A further output of this alternative first switch may be connected with auxiliary signal paths.

Besides the carrier aggregation sub-module, other ones of the already described parts of the front-end module may be separately integrated on at least a further sub-module. All sub-modules of the front-end module are mounted on and electrically connected to the main module front-end module. All together that is main module and sub-modules represent the frontend module.

In an embodiment, at least one resonator forming the at least one notch in the notch path comprises a parallel circuit of a capacitance element (i.e. a capacitor C) and an inductance element (i.e. an inductor L), connected in series.

In a further embodiment, the resonator comprises a series circuit of a capacitance element and an inductance element. The switch plus the parallel-LC-resonator connected in series of the former embodiment are replaced by a switch in series with a series-LC-resonator, connected in parallel. To realize an open state it uses a series transmission line whose length complies with a quarter wavelength of the counter band frequency.

Further, each resonator may be coupled to a shunt inductance element or series transmission line to turn the angle of the OOB reflection coefficient F backward, respectively forward towards an open state.

Each of the capacitance elements and inductance elements in the notch path or maybe in any other signal line can be formed as a discrete device mounted on top of the front-end module. Alternatively, these elements may be realized as integrated elements within the substrate of the module. In this case, the substrate is a multi-layer board formed as a laminate or a multi-layer ceramics, for example an LTCC or an HTCC ceramic board. These elements can be chosen according to the required quality factor of the element. A high quality factor may be required for an element arranged in a signal path assigned a respective band whose specifications can only be met with high-quality elements. Discrete inductance elements typically show higher Q than integrated inductance elements. It is also possible to combine discrete and integrated elements in a resonator. Such hybrid resonators preferably use capacitance elements integrated in LTCC and discrete high-quality inductance elements mounted on top.

Each of the transmission line elements can be discrete or parasitic, for example due to routing.

A resonator in the at least one notch path can be tuned at the frequency of the band from the auxiliary communication system, and a fourth communication system that is active together with the main signal path connected to the notch path in one of the first carrier aggregation modes. This resonator forms a high impedance element for a frequency of the counter band in the carrier aggregation mode.

A front-end module according to the invention may comprise elaborated switches with different throws of different qualities. High-quality throws can provide a higher linearity of the switch and are known in the art. Such a high-quality throw may be designed with an enhanced gate width if the switch is formed as a transistor. A further high-quality throw can use two enhanced gate width transistors in series to provide a throw having a better isolation. Despite the higher effort and the higher cost of such high-quality throws, the positive effects can make such an improved switch attractive. Due to the high quality of the switch, the front-end module can be designed more complex by combining more signal paths within the front-end modules. The problems that arise otherwise are reduced by the positive effects of the improved switch.

BRIEF DESCRIPTION OF THE DRAWINGS

The invention will be explained in more detail in connection with the accompanying figures which are drawn schematically and not to scale.

DETAILED DESCRIPTION OF ILLUSTRATIVE EMBODIMENTS

Figure 5:
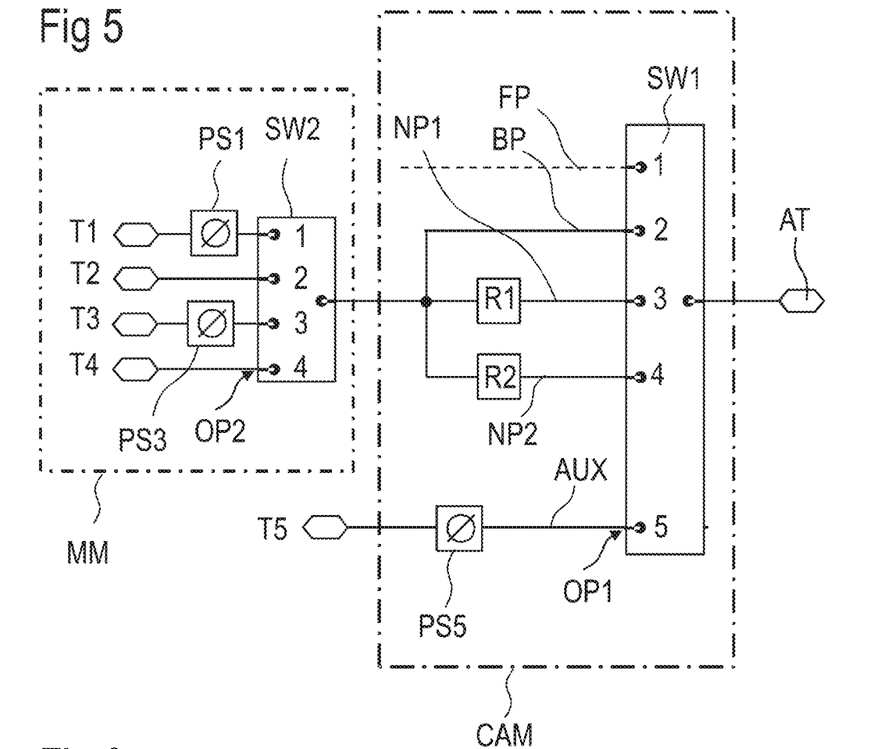
FIG. 5 shows a first front-end module of the invention.

FIG. 5 shows a first embodiment according to the invention. In principle, the new front-end module is a cascade of a first switch SW1 and a second switch SW2. First and second switch are connected by at least three different signal paths. One of the connecting paths is a bypass BP without phase shifter and without resonator, directly connecting first and second switches. At least one notch path N1, NP2 connects another output OP1 of the first switch SW1 with the input of the second switch SW2. The notch path NP comprises a notch and the notch comprises a resonator R1. The further notch path NP2 and others are connecting further outputs of the first switch SW1 with the input of the second switch SW2 with further notches arranged therein. The notches are tuned to provide a high impedance state for frequencies within the counter band of a carrier aggregation mode.

In the paths, matching may be needed to stay at a certain impedance level or to match components before connecting them. Such matching is common practice and therefore not shown in the figures, and not mentioned in text. So, even a direct connection may still include matching elements, either discrete or parasitic.

A further output OP1 of the first switch SW1 is connected to a first auxiliary signal path AUX wherein a phase shifter PS5 is arranged.

The first switch SW1 may have further paths FP connected to an output thereof, one of them is shown in the figure. But it is advantageous that the first switch SW1 has a low number of throws or outputs that make the switch simple having a low loss.

The first switch SW1 is a direct mapping switch that can connect an antenna terminal AT that is connected to the input of the switch with one or more of the outputs. The switch may be governed by an MIPI interface allowing direct mapping.

The second switch SW2 may be of the same simple design with a low number of throws. The input of the second switch is coupled by a connecting path to an output of the first switch to connect the same with one or more main signal paths that are connected to the outputs OP2 of the second switch SW2. In the figure, four main signal paths are shown extending between an output OP2 and a terminal T1-T4 respectively. The main signal paths are assigned to different bands of a wireless communication system or a radio system. Interfaces or terminals for connecting the main signal paths to the respective transceiver units behind the front-end module are referenced in the figure with T1 to T4.

Each of the main signal paths may comprise a phase shifter PS1, PS3 that is designed to provide an open state for frequencies of a counter band in a carrier aggregation mode.

In the figure, first and second switch are arranged on different sub-modules wherein a first module is a carrier aggregation module CAM comprising the first switch and the connecting signal paths. The second module is a main module MM comprising the second switch and the main signal paths.

The main module MM would allow single mode operation in each single one of the four bands assigned to the four main signal paths by directly connecting the input of the second switch with the antenna terminal AT. Inserting the carrier aggregation module CAM between antenna terminal AT and second switch allows at least one carrier aggregation mode as well as single mode operation in the auxiliary signal path AUX.

The main module MM may further comprise filters and duplexers arranged in the main signal paths. The bands these main signal paths are assigned to are selected to represent main bands that are indispensable and should be provided by every mobile phone. If desired, the main module MM may comprise further signal paths according to the specification of the customer.

The carrier aggregation module CAM could serve as an interface between antenna terminal AT and further sub-modules or further signal paths.

With the front-end module shown in FIG. 5, each of the connected signal paths may be separately addressed in a single mode operation. Then, signal paths that are connected to the output OP2 of the second switch SW2 are addressed by switching the second switch SW2 to a respective throw 1 to 4. In this case, the first switch SW1 is switched to the bypass BP which is the second throw in the figure. Bypass means that the antenna terminal AT is directly connected to the input of the second switch.

A first auxiliary signal path assigned to a first auxiliary communication system can be switched to the antenna terminal AT via the fifth throw of the first switch SW1. As there is no second switch arranged between antenna terminal and the transceiver, this auxiliary signal path has the lowest insertion loss signal path shown in the figures. Hence, this auxiliary signal path can preferably be used to connect an external or exceptional band that requires special care in the course of high technical demands or given specifications. Such special specifications can be due to a high frequency beyond the ranges of the other bands. With the arrangement shown in FIG. 5, the high specification for such an external communication system can be met.

Beside the single band operation mode, at least three different carrier aggregation modes can be set with the front-end module shown in FIG. 5. In a first carrier aggregation mode the main communication system of the signal path that is connected to terminal T2 and the first auxiliary communication system AUX that is connected to terminal T5 are active at the same time. This mode is set by the switches thereby connecting in parallel the two signal paths to the first antenna terminal AT. For this mode, the first switch is set to the third throw enabling a notch path with a first notch realized as a first resonator R1 arranged in the notch path. The 5$^{th}$ throw of the first switch connected to first auxiliary path AUX is closed (active) at the same time. The first resonator R1 blocks the frequencies of the auxiliary communication system and thereby avoids loading of the signal path connected to the second throw of the second switch. The phase shifter PS5 arranged in the auxiliary signal path provides an open state for frequencies assigned to the communication systems connected to terminal T2.

In a second carrier aggregation mode, the communication systems coupled to terminals T4 and T5 are combined using the same resonator R1 as a notch for the frequency of the auxiliary communication system connected to terminal T5.

In general the values for phase shifter PS5 are different for CA modes with T4 and for CA modes with T5. Therefore phase shifter PS5 is tuned in a bill-of-materials (LOM) variant, or phase shifter PS5 is outside the CA module CAM, so that it can be tuned by the customer.

In a third or a fourth carrier aggregation mode main signal paths connected to terminals T1 or T3 are coupled to the auxiliary path using phase shifter PS1 and PS3 respectively to avoid loading of the respective main signal path by frequencies of the counter band that is the auxiliary path. In this case the bypass BP between first and second switch may be used.

Starting from an embodiment as shown in FIG. 5, a fourth switch SW4 can be connected to an output of the first switch SW1, for example via the further signal path FP.

Figure 6:
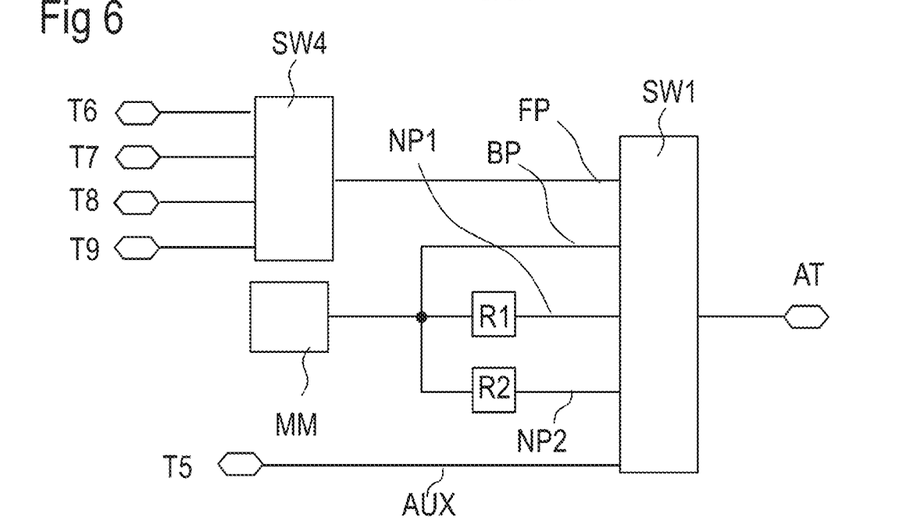
FIG. 6 shows a second front-end module of the invention.

FIG. 6 shows such an arrangement. Via the fourth switch, a series of fourth signal paths can be coupled to the antenna terminal when the further path the first switch SW1 is enabled and active. The fourth signal paths extend from a respective terminal T6 to T9 to the output of the fourth switch and can be addressed in a single band operation via selecting a throw of the fourth switch SW4. The paths may contain phase shifters, too, to allow carrier aggregation mode between two fourth signal paths or between a fourth path and one of first auxiliary path AUX and main signal path. Each of these paths may further contain filters or duplexers.

The bands of the main communication systems may differ from the bands of the fourth communication system by being assigned to another frequency range above or below the frequency range of the main signal paths respectively the assigned bands of the main communication systems. For example, the main bands may accord to a low band frequency range where the fourth band may accord to a high band frequency range. The separation of the bands may be made alternatively due to customer requirements or by technical needs.

It is possible to discriminate the bands the front-end module via another classification. It is possible to discriminate a low-band part comprising frequencies between 600 and 1000 MHz, a Japanese band part comprising frequencies between 1400 and 1500 MHz, a mid-band part comprising frequencies between 1700 and 2200 MHz, and a high-band part comprising frequencies between 2300 and 2700 MHz. It is possible to divide these four groups or frequency ranges in the middle to result in a higher and a lower band group. It is further possible to group the four frequency ranges in such a way that a basic frequency and a respective harmonic frequency range are combined. This is possible for the low band range and the mid-band range as well as a group comprising Japan-band frequency ranges and high-band frequency ranges.

Further switches may be connected to free throws of the first switch allowing to connect a further group of signal paths to the antenna terminal via the cascade of the first and the further switch.

Figure 7:
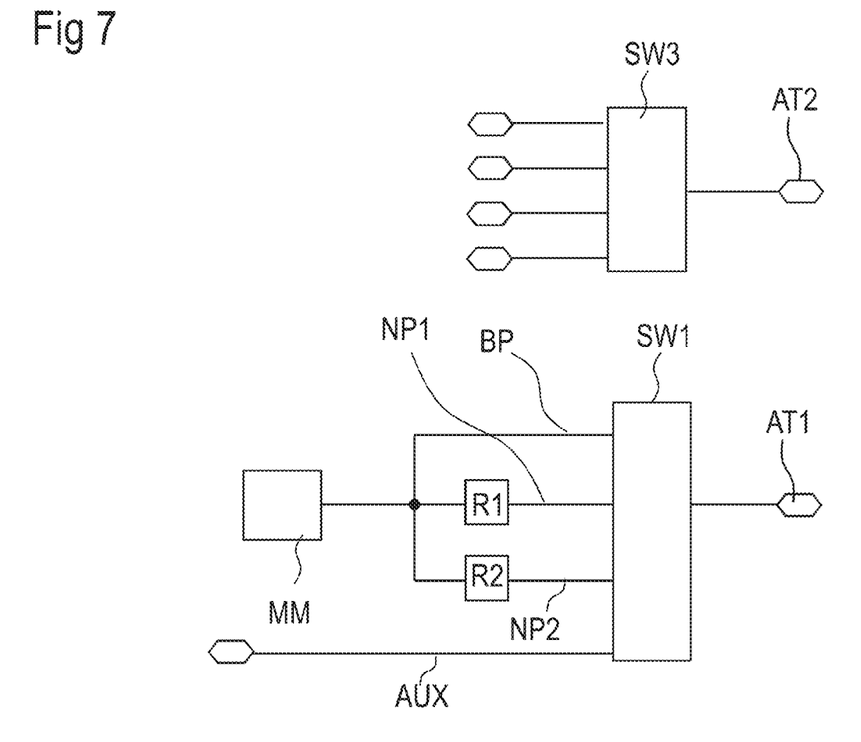
FIG. 7 shows a third front-end module of the invention.

With a second antenna terminal AT2 and two antennae present in a mobile phone, the complexity of the front-end is reduced, because CA combinations can then also be based on antenna multiplexing, if the antennas have sufficient isolation. FIG. 7 shows such a solution. First antenna terminal AT1 is connected to the first switch SW1 as shown in FIG. 5 or 6, for example, while second antenna terminal AT2 is connected to a fourth switch SW4. Two antenna terminals allow a good isolation between the bands coupled to the first antenna terminal and bands coupled to the second antenna terminal. The respective frequency ranges are preferably chosen that all bands connected to the second terminal AT2 are higher than the bands connected to the first antenna terminals AT1.

Figure 8:
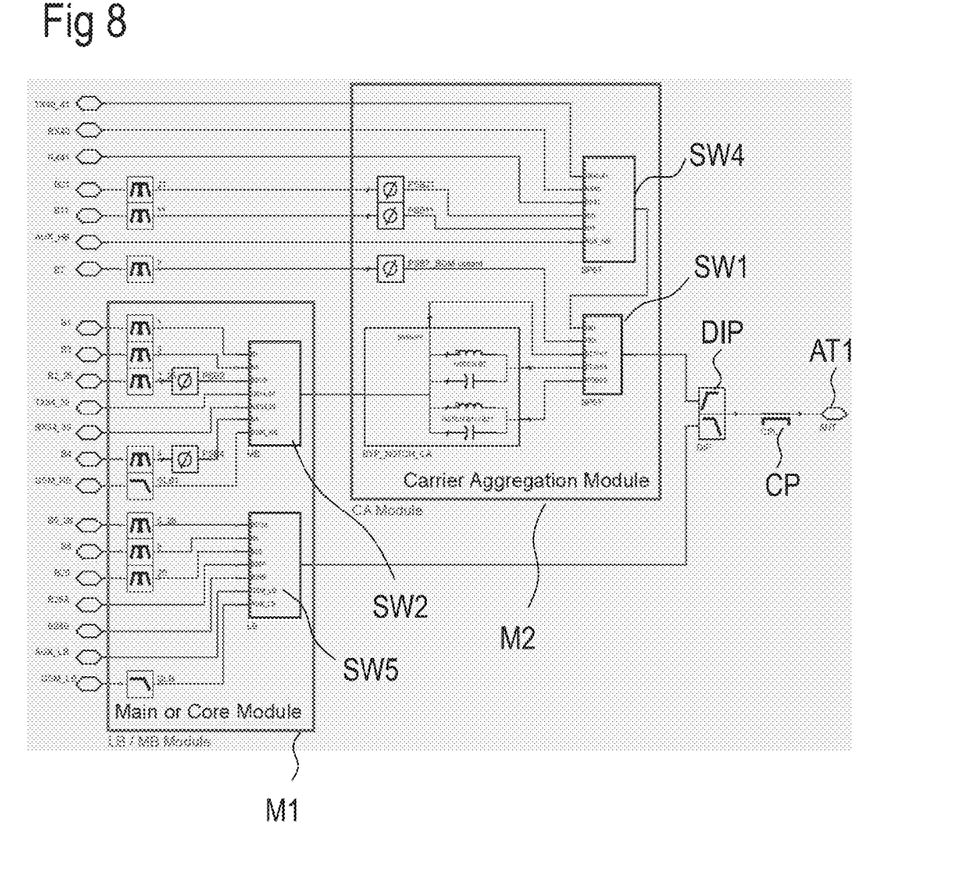
FIG. 8 shows a fourth front-end module of the invention.

FIG. 8 shows further possible extensions of the front-end module for a case where one antenna terminal AT1 only is present. In addition to an arrangement like the one shown in FIG. 6, a diplexer DIP is interposed between the first antenna terminal AT1 and the first switch SW1. The diplexer can route high frequencies via a high pass filter to the first switch SW1 and lower frequencies via a low pass filter to a fifth switch SW5. A fourth switch SW4 can be connected to a throw of the first switch SW1. Via a combined setting of switches SW1 and SW4, any one of the signal paths connected to fourth switch SW4 can be coupled to the antenna terminal AT1. In the embodiments these fourth paths connected to fourth switch SW4 are assigned as follows (from top to bottom):

TX40/41; RX40; RX41; B21; B11; AUX_HB (auxiliary high band) and B7.

First switch SW1 and second switch SW2 are connected via a bypass and at least one notch path according to the arrangement according to FIG. 5, for example. In the figure two notch paths are shown. The upper one is a notch for band 7, the lower one is a notch for band 11 and 21.

In the shown embodiment the second paths connected to second switch SW2 are assigned as follows (from top to bottom):

B1; B3; B2/25; TX34/39; RX34/39; B4 and GSM high band.

In the shown embodiment the fifth paths connected to fifth switch SW5 are assigned as follows (from top to bottom):

B5/26; B8; B20; B28A; AUX LB and GSM LB.

The bands that are assigned to the signal paths that are connected to second and fifth switch SW2, SW5 in FIG. 8 may be core bands or main bands that are indispensable in a specific region. Hence, the two switches SW2 and SW5 can be arranged in the same module M1, forming a core module.

In the band 7 signal path coupled to a throw of the first switch SW1 a phase shifter PSB7 is shown that is necessary only for a BOM variant and that can be neglected in other variants.

Carrier aggregation mode can be enabled by means of the second module M2 comprising the connecting signal path between first and second switch as well as the third switch SW4 and the signal paths connecting to the third switch. The second module M2 is hence a variable module and similar to the carrier aggregation module CAM of FIG. 5.

Between antenna terminal AT1 and diplexer DIP, a coupler CP can be connected to the signal line providing information about incident power and reflected power.

In the fourth signal paths assigned to bands B21, B11 and B7 a duplexer as shown may be present. Same is true for second signal paths assigned to bands B1, B3, B2/25 and B4 as well as for fifth signal paths assigned to bands B5/26, B8 and B20.

In the fourth paths connected to fourth switch SW4 phase shifters PS are present in the paths assigned to bands B2/25 and B4.

In the second paths connected to second switch SW2 phase shifters PS are present in the paths assigned to bands B21, B11 and B7.

Figure 9:
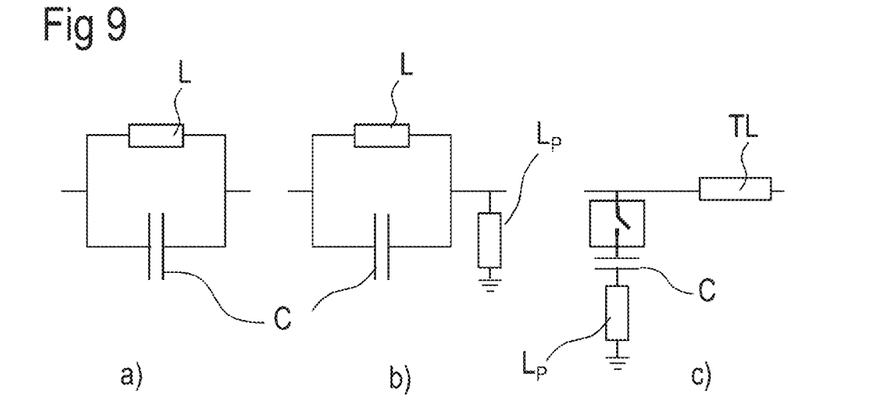
FIG. 9 shows three resonators used in a module of the invention.

FIG. 9 shows three possible embodiments a), b) and c) of how to realize a resonator that can form a notch within the notch path as shown in FIGS. 5 and 6, for example.

The resonator according to a) of FIG. 9 is a parallel resonance circuit of an inductance L and a capacitance C. The resonance of this circuit is tuned to the counter band frequency, which is the pass band frequency of the band to which the notch is connected to.

Embodiment b) of FIG. 9 shows a further extension where a shunt inductance LP is connected to the parallel resonance circuit.

A third embodiment according to c) of FIG. 9 shows a shunt series resonance circuit of a capacitor C and an inductance LP. Within the signal line, a transmission line TL is inserted. The shunt is coupled to the series line via a switch to toggle between single mode operation and CA mode operation.

Further circuits known from the art having a different circuit topology but realizing a series open circuit for the frequencies to be blocked are possible, too. By default, the resonators are tuned at the OOB frequencies, thus providing an open.

Tuning of the resonators, phase shifters, etc. may be done by further using the parasitics of components present in the module or by parasitics that are inherent to conductor lines. So, an inductor already has a certain parasitic shunt capacitance and a capacitor already has small parasitic series inductance. These parasitics have to be taken into account when designing a resonator, phase shifter, or another circuit using LC elements. Then, as a further profit, components can be saved and insertion loss can be minimized.

Capacitance C and inductance L can be made as discrete elements or can be constructed from integrated elements that are preferably part of the wiring within the substrate front-end module is mounted on. As already explained, it may be preferable to use discrete elements and integrated elements as well in a combination. The transmission line may be a parasitic of a signal line the value thereof is due to routing the line. Transmission lines give extra delay and the resonator can be tuned to resonate below OOB frequency. On the other hand, if less phase shifting is desired, a shunt inductor can be used to turn the phase back. The advantage of a resonator that is tuned at the OOB frequency is that the OOB Γ does not depend on the impedance after the series resonator. However, in practice, this is not a necessary requirement. A solution where the resonator is tuned below or above OOB frequency can be realized with less components, with less insertion loss and smaller in size. In embodiment c) of FIG. 9, the shunt series resonance circuit is coupled to the signal line via a switch. This switch in the shunt path replaces the series switch in SW1. A λ/4 delay line or transmission line TL is needed to transform the resonant shunt short to a resonant series open. The embodiment can be further optimized by switching a bypass to avoid the insertion loss of the λ/4 delay line or transmission line TL.

In all cases, the resonator can be combined with or can be part of the matching network. This helps further saving components.

Figure 10:
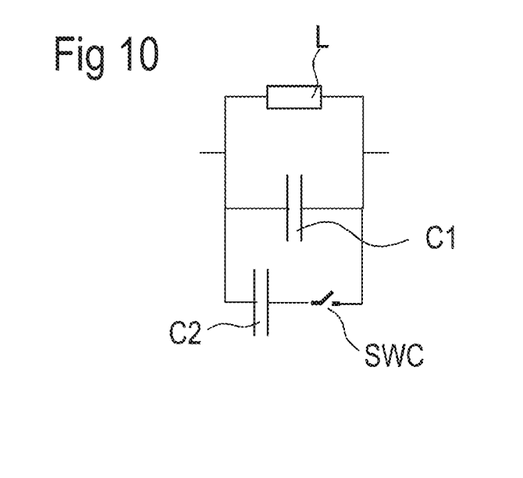
FIG. 10 shows a tunable resonator that can be used in a module of the invention.

FIG. 10 shows an embodiment of a tunable resonator. Tuning can be done by switching a further capacitance C2 in parallel to the capacitance C1 of a parallel resonance circuit, for example according to embodiment a) of FIG. 10. The switch SWC allows to tune the resonator to two different frequencies. According to a further optimization, further switches may be used to switch further capacitance to the circuit to allow a broader tuning range or a finer tuning scale.

As already explained, the first through the fifth switch may be realized as a customized switch having special throws for low insertion loss, high linearity and high isolation. The technique for the switch can be chosen arbitrarily and may comprise CMOS or other field-effect-transistors (FETs) integrated in silicon-based technology, such as bulk-Si, silicon-on-insulator SOI, silicon on sapphire SOS, optionally with substrate transfer technology, or in another semiconductor material.

Figure 11:
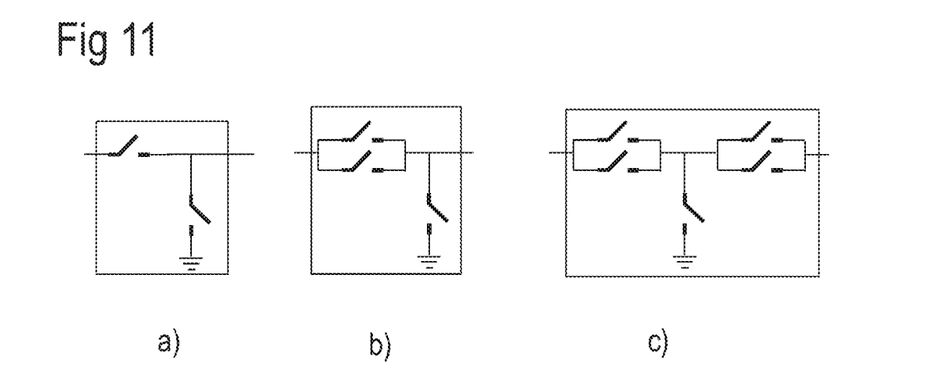
FIG. 11 shows special throws of a switch that can be used in a module of the invention.

FIG. 11 a) shows a block diagram of a standard throw. Antenna terminal AT is on the left side, the output throw is on the right side. The switch in the series signal line is to interrupt (open, off-state) or pass (closed, on-state) the signal line. The switch in the shunt line is open in on-state and closed in off-state to improve isolation between the AT input and throw output. Hence, the switching state shown in either of a) to c) of FIG. 11 is not a real one, as in practice the series switch(es) and the shunt switch always have opposite states, i.e. series closed and shunt open, or series open and shunt closed.

Embodiment b) of FIG. 11 shows a throw for low insertion loss and high linearity. The switch within the series signal line is more linear and has a higher power capability compared to a). It can be realized by using a wider gate width for the transistor. The switch in the shunt line is for isolation between switch input (antenna) and switch output (throw). Here, too, the series switches and the shunt switch in practice always have opposite states.

Embodiment c) of FIG. 11 shows a special switch throw for high linearity and high isolation. In this embodiment, two series switches like those shown in embodiment b) are circuited in series in the series signal line. A switch in the shunt line is for isolation between switch input (antenna) and switch output (throw). Again, the series switches and the shunt switch in practice always have opposite states.

A high linearity switch throw has lower generation of harmonics and mixing products, for example for band 7 where a second harmonic and intermodulation products must be low enough to allow co-existence with WiFi.

High isolation switch throws are sometime needed to meet specified isolation between different bands or between TX and RX.

Via direct mapping, all throws can be controlled with individual register bits. This is a standard for current switches that support carrier aggregation modes via a control according to the MIPI standard. If using only standard switches, the system performance would be worse and may be not complying with the specifications. A customized switch may comprise a combination of the throws that are shown in FIG. 11, for example. Sophisticated specifications can be met only by special switch throws for low insertion loss, high linearity and a high isolation.

Finally, the cascaded arrangement of two switches compared to a standard solution where a single switch that is a high throw count switch is used to address all the signal paths according to the bands the front-end module can operate in has the lowest insertion loss which is opposite to that one would expect. When doing calculations based on measured values for all the contributions, one can find that the proposed solution of the invention has a lower insertion loss. This is basically due to the fact that the insertion loss of the only one but high throw count switch of the conventional solution (see FIG. 4, for example) is higher than the insertion loss of two cascaded low throw count switches. These insertion loss calculations were based on models and measurements on actual switches.

A lot of further embodiments and variations are possible without departing from the basic idea of the invention. The core idea is to interpose a carrier aggregation module or circuit between a first and a second switch. This carrier aggregation module or circuit comprises at least a bypass, a first and optionally a second notch path that can be addressed via the first switch and allow changing between single band operation and carrier aggregation mode for the bands that are connectable to the outputs of the second or any further switch. The carrier aggregation module or circuit has a multiple carrier aggregation band combination functionality and with optimal single band and CA mode performance due to the switchable bypass and the switchable series open resonators.

The basic idea is easily extendable by connecting further switches, further sub-modules or adding switches or sub-modules to a second antenna terminal. The separation or partitioning of the different parts of the front-end module can be done according to customers' specifications and is not limited to the concrete design of any embodiment which is for explanation purpose only. Other assignments of the bands coupled to a certain switch or arranged on a certain sub-module can be made according to any specification that is required by a region, a standard or a customer's desire.

In a possible embodiment the following defined bands or band combinations can be assigned to the different parts of the frontend module:

The main module may comprise for high bands:
Bands B1, B4, B3, B2/25, TX34/39, GSM_HB A high band switch realized as a fourth switch SW4 for example may comprise auxiliary inputs for:
Bands TX40/41, RX40, RX41, B21, B11 and any other auxiliary high band.

The auxiliary band AUX directly coupled to the first switch can be band B7, which is commonly used in mobile communication systems, but which is in the highest frequency range, and which has high linearity requirements because of WiFi co-existence.

A further set of core bands may be assigned to the paths connected to the fifth switch of FIG. 8 for low bands:
B5/26, B8, B20, B28A, B28B, GSM_LB as well as any other low band (LB) auxiliary bands.

Alternatively the further set of core bands can be assigned to the bands coupled to the fourth switch of FIG. 6.

Any assignment of bands, band combinations and parts or sub-modules shown in the embodiments is exemplary only and does not limit the scope of the invention which is independent from these assignments. Numbers of used bands can be different from the numbers shown in the embodiments.

The invention claimed is:
1. A front-end module comprising:
an antenna terminal;
a first switch having an input connected to the antenna terminal and a number of k outputs, wherein k is an integer equal or greater than 3; and
a second switch having an input and a number of n outputs, n being an integer equal or greater than 2,
wherein a first output of the first switch is directly connected to the input of the second switch via a bypass path, wherein a second output of the first switch is connected to the input of the second switch via at least one notch path comprising a notch, wherein a third output of the first switch is connected to at least one auxiliary signal path assigned to a band of an auxiliary communication system, wherein each of the n outputs of the second switch is connected to a main signal path assigned to a band of a main communication system respectively, wherein the notch comprises a resonator adapted to provide a high impedance element for a frequency assigned to the band of the auxiliary communication system, wherein the first and second switches are configured to set a single band operation mode and a carrier aggregation mode, and wherein, in the carrier aggregation mode, one of the main signal paths is coupled to the antenna terminal via the at least one notch path, and the at least one auxiliary signal path is coupled to the antenna terminal in parallel to the one of the main signal paths.

2. The front-end module of claim 1, wherein the first and second switches are configured to select two or more different carrier aggregation modes, wherein in each of these two or more different carrier aggregation modes a respective one of the main signal paths is connected to the antenna terminal via the notch path comprising the notch and wherein the at least one auxiliary signal path is connected to the antenna terminal in parallel to the respective one of the main signal paths and the notch path.

3. The front-end module of claim 1, wherein the first and second switches are configured to set a further carrier aggregation mode by connecting two further signal paths selected from the main signal paths and one of the auxiliary signal paths to the antenna terminal in parallel, each of the further signal paths comprising a phase shifter adapted to mutually provide an open state for a signal having a frequency within a band of another further signal path of the main signal paths.

4. The front-end module according to claim 1, further comprising a second antenna terminal connectable to a series of second signal paths via a third switch, each second signal path assigned to operate in a high band having a frequency higher than the frequencies the main signal paths are assigned to.

5. The front-end module according to claim 1, further comprising a fourth switch having an input connected to a fourth output of the first switch, the fourth switch comprising outputs each being connected to a respective one of third signal paths assigned to a band of a third communication system.

6. The front-end module according to claim 5, wherein the at least one auxiliary signal paths, the main signal paths and the third signal paths comprises at least one of a bypass path, a duplexer, a filter, a transmission line or a phase shifter.

7. The front-end module according to claim 1, wherein the first switch, the bypass path and the at least one notch path comprising the notch are integrated on a sub-module, wherein the second switch is integrated on at least a further sub-module, and wherein the sub-module and the further sub-module are mounted on or electrically connected to a main front-end module.

8. The front-end module according to one of claim 1, wherein the resonator comprises a capacitance element connected in parallel with an inductance element.

9. The front-end module according of claim 8, wherein the resonator is connected with a series transmission line.

10. The front-end module according to claim 1, wherein the resonator comprises a capacitance element connected in series with an inductance element.

11. The front-end module according of claim 10, wherein the resonator is connected with a series transmission line.

12. The front-end module according to claim 1, wherein the resonator is coupled to a shunt inductance element.

13. The front-end module according to claim 1, wherein each resonator in the at least one notch path is tuned at the frequency of the band of the auxiliary signal path or a third communication system that is active together with the at least one notch path in the carrier aggregation mode.

14. The front-end module according to claim 1, further comprising a series of signal paths, frequencies thereof lying within the same decade and being connected to the first switch via respective throws, wherein the throws comprise transistors having an enhanced gate width for lower insertion loss and higher linearity with respect to standard throws used for signal paths assigned to out-of-band frequencies.

15. The front-end module according to claim 1, wherein the first and second switches comprise throws comprising transistors having an enhanced gate width for a lower insertion loss and a higher linearity, and wherein, in an on-state of such a throw, two gates of enhanced gate widths are circuited in series for better isolation.

16. The front-end module according to claim 1,
wherein the front-end module has a substrate that is made of a laminate or a multilayer ceramic, and
wherein capacitance elements and/or inductance elements of the resonator or a phase shifter are integrated within the substrate.

17. The front-end module according to claim 1, wherein the main signal paths and the at least one auxiliary signal path that are coupled in parallel to the antenna terminal in the carrier aggregation mode comprise at least one of a notch and a phase shifter both adapted to mutually provide a high impedance for a signal within the band of the respective other signal path.

18. The front-end module according to claim 17, further comprising enabling the carrier aggregation mode by coupling a transmit path in parallel to another signal path to the antenna terminal.

* * * * *